US010300842B2

(12) United States Patent
DeNolf et al.

(10) Patent No.: US 10,300,842 B2
(45) Date of Patent: May 28, 2019

(54) DIFFUSING LAYER FOR A LIGHT EMITTING APPARATUS

(71) Applicant: Gentex Corporation, Zeeland, MI (US)

(72) Inventors: Garret C. DeNolf, Grand Rapids, MI (US); David J. Cammenga, Zeeland, MI (US); Adam R. Heintzelman, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 89 days.

(21) Appl. No.: 15/487,554

(22) Filed: Apr. 14, 2017

(65) Prior Publication Data
US 2017/0297481 A1    Oct. 19, 2017

Related U.S. Application Data

(60) Provisional application No. 62/324,669, filed on Apr. 19, 2016.

(51) Int. Cl.
*B60Q 1/26*      (2006.01)
*B60R 1/04*      (2006.01)
(Continued)

(52) U.S. Cl.
CPC ............. *B60Q 1/2665* (2013.01); *B60R 1/04* (2013.01); *B60R 1/06* (2013.01); *B60R 1/12* (2013.01); *B60R 2001/1215* (2013.01)

(58) Field of Classification Search
CPC ........... B60Q 1/2665; B60R 1/04; B60R 1/06; B60R 1/12; B60R 1/1207; B60R 2001/1215
(Continued)

(56) References Cited

U.S. PATENT DOCUMENTS 5,928,572 A    7/1999    Tonar et al.
6,002,464 A    12/1999   Fujisawa et al.
(Continued)

FOREIGN PATENT DOCUMENTS

WO    199842796 A1    10/1998
WO    2017184450 A1   10/2017

OTHER PUBLICATIONS

International Search Report and Written Opinion of the International Searching Authority, or the Declaration, dated Aug. 24, 2017, for International Application No. PCT/US20171027644, filed Apr. 14, 2017, 8 pages.
(Continued)

*Primary Examiner* — Alan B Cariaso
(74) *Attorney, Agent, or Firm* — Price Heneveld LLP; Bradley D. Johnson

(57) ABSTRACT

An illumination assembly configured to emit diffuse light through an indicator is disclosed. The assembly comprises a substrate having an applique disposed thereon. The applique forms an opening configured to transmit light through the substrate. The assembly further comprises a light source in connection with a circuit and configured to emit light through the shape. A diffusing layer is applied to a surface of the assembly between the circuit and the substrate. The diffusing layer comprises a resin material configured to cure in response to exposure to ultraviolet light or heat. The diffusing layer further comprises a filler material comprising a plurality of beaded structures configured to diffuse light from the light source.

16 Claims, 7 Drawing Sheets

(51) Int. Cl.
    *B60R 1/06*     (2006.01)
    *B60R 1/12*     (2006.01)

(58) Field of Classification Search
    USPC .................................................. 427/595
    See application file for complete search history.

(56) References Cited

U.S. PATENT DOCUMENTS

| | | | |
|---|---|---|---|
| 7,327,415 B2 | 2/2008 | Brickey et al. | |
| 7,656,580 B2 | 2/2010 | Chang | |
| 7,717,596 B1 | 5/2010 | Bell | |
| 8,864,322 B2 | 10/2014 | Cammenga et al. | |
| 8,982,468 B2 | 3/2015 | Petaja et al. | |
| 9,482,889 B2 * | 11/2016 | Choe | G02F 1/1313 |
| 2005/0152038 A1 | 7/2005 | Nishida et al. | |
| 2007/0058257 A1 * | 3/2007 | Lynam | B60Q 1/2665 |
| | | | 359/604 |
| 2008/0284942 A1 | 11/2008 | Mahama et al. | |
| 2009/0115631 A1 * | 5/2009 | Foote | B60Q 1/2665 |
| | | | 340/901 |
| 2010/0066519 A1 | 3/2010 | Baur et al. | |
| 2010/0201896 A1 | 8/2010 | Ostreko et al. | |
| 2010/0271840 A1 * | 10/2010 | Hamada | G02B 5/0242 |
| | | | 362/606 |
| 2013/0250189 A1 | 9/2013 | Choe et al. | |
| 2014/0192392 A1 | 7/2014 | Cammenga et al. | |
| 2016/0078768 A1 * | 3/2016 | Huizen | G08G 1/167 |
| | | | 340/435 |

OTHER PUBLICATIONS

Georgalis, Michael, Legal Consultant, "Light Control and Efficacy Using Light Guides and Diffusers," LEDs 2012, Fusion Optix, Oct. 11, 2012, pp. 1-15.

* cited by examiner

DIFFUSING LAYER FOR A LIGHT EMITTING APPARATUS

CROSS REFERENCE TO RELATED APPLICATION

This application claims priority to and the benefit under 35 U.S.C. § 119(e) of U.S. Provisional Patent Application No. 62/324,669, filed on Apr. 19, 2016, entitled "DIFFUSING LAYER FOR A LIGHT EMITTING APPARATUS," the entire disclosure of which is hereby incorporated herein by reference.

BACKGROUND OF THE INVENTION

The present invention generally relates to a lighting apparatus for a vehicle and more particularly relates to a lighting apparatus for a mirror assembly comprising a diffusing layer.

BRIEF SUMMARY OF THE INVENTION

In one aspect of the invention, an illumination assembly configured to emit diffuse light through an indicator is disclosed. The assembly comprises a substrate having an applique disposed thereon. The applique forms an opening that defines a shape configured to transmit light through the substrate. The assembly further comprises a light source in connection with a circuit and configured to emit light through the shape. A diffusing layer is applied to a surface of the assembly between the circuit and the substrate. The diffusing layer comprises a resin material configured to cure in response to exposure to heat or ultraviolet light and a filler material comprising a plurality of beaded structures configured to diffuse light from the light source.

In another aspect of the disclosure, a method for manufacturing an illumination assembly is disclosed. The illumination assembly comprises a diffuse light indicator. The method comprises preparing a substrate corresponding to a display surface to receive a coating and applying an applique on the substrate thereby forming an opening. The opening defines a shape of the diffuse light indicator. The method further comprises applying a liquid diffusing layer over the applique, the liquid diffusing layer comprising a resin material and attaching a circuit comprising at least one light source to the substrate enclosing the applique and the diffusing layer therebetween. The method further comprises curing the liquid diffusing layer thereby generating a hardened diffusing layer laminating the substrate to the circuit.

In yet another aspect of the disclosure, an illumination assembly configured to emit diffuse light through an indicator is disclosed. The assembly comprises a substrate and an applique disposed on the substrate forming an opening. The opening defines a negative shape configured to transmit light through the substrate. A light source is in connection with a circuit and configured to emit light through the shape. A diffusing layer comprising a first portion and a second portion is applied to a surface of the assembly between the circuit and the substrate. Each of the first portion and the second portion comprise a resin material configured to cure in response to exposure to ultraviolet light or heat and a filler material comprising a plurality of beaded structures configured to diffuse light from the light source.

These and other features, advantages, and objects of the present invention will be further understood and appreciated by those skilled in the art by reference to the following specification, claims, and appended drawings.

DETAILED DESCRIPTION

Figure 1:
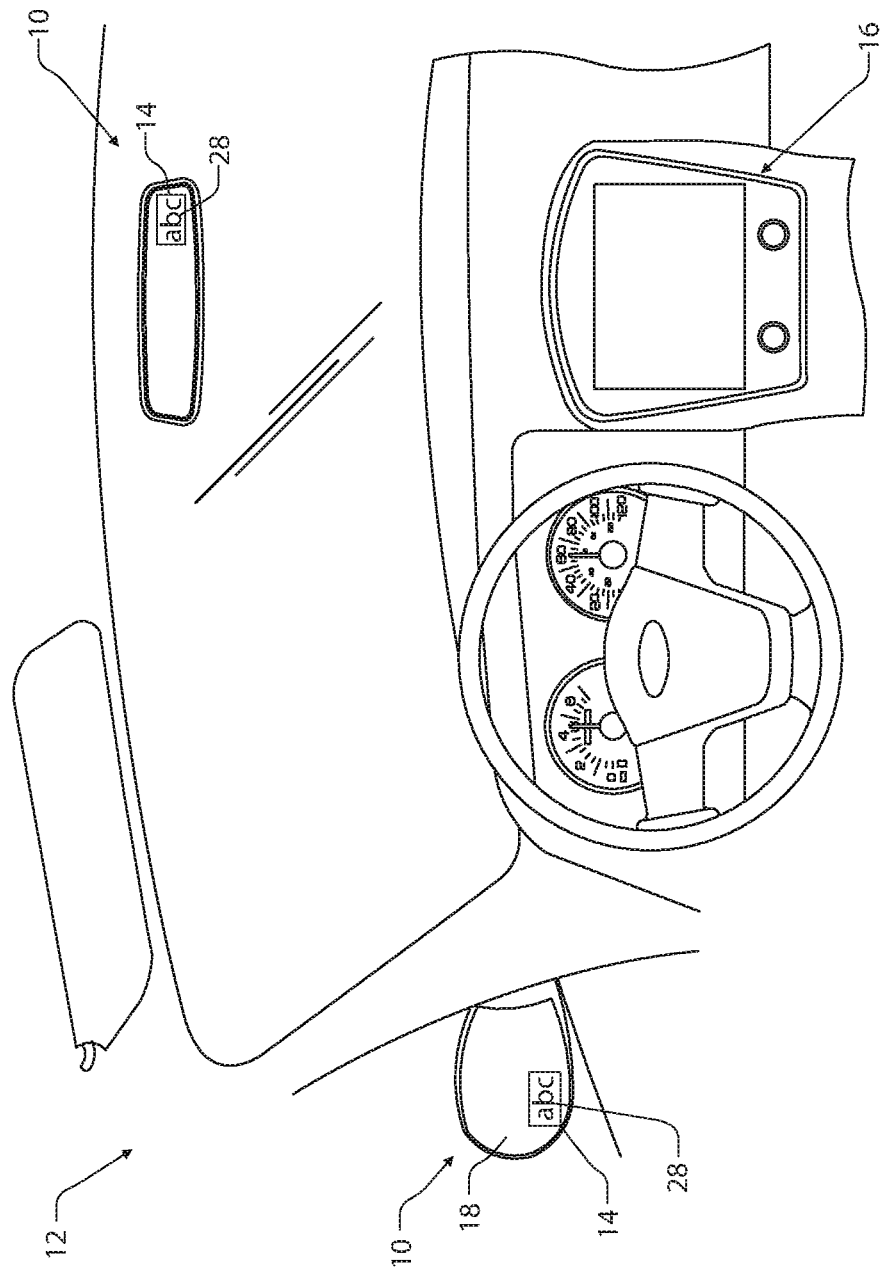
FIG. 1 is an environmental view of an interior cabin of a vehicle incorporating a mirror assembly.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The disclosure relates to a lighting apparatus configured to provide one or more lighted features for an automotive mirror. Such features may be selectively illuminated to project light through a substrate of an automotive mirror. Some examples of such features may include compass displays, signal lighting for outside mirrors, side blind zone indicators, approach lighting, and other indicators and/or warning lights. When incorporating lighted features it may be important to utilize a diffuser to diffuse light produced by a light source. Without a diffuser, the LED light source may create a hot spot where the observer sees the point light source directly. If there is an insufficient amount of diffusion, the backlit feature may have a hot spot which can be objectionable to the observer.

For example, a diffuser may be placed between an LED light source and an observer of a feature incorporated in a mirror so that the feature or indicator is uniformly illuminated. A diffuser may be incorporated in a mirror as a separate plastic substrate containing diffusing materials. The plastic diffuser may be placed behind the mirror using an adhesive to keep it in place. The plastic diffuser may also be held in place by a mechanical structure or compressed between various components of a mirror assembly. If no adhesive is used, there may be a first air gap between the diffuser and the mirror and a second air gap between the diffuser and the light source.

Referring to FIG. 1, an exemplary embodiment of a mirror assembly 10 disposed in a vehicle 12 is shown. The mirror assembly 10 may comprise an indicator 14 configured to emit light. The indicator 14 may correspond to various forms of indicator lights as discussed herein. In an exemplary embodiment, the indicator 14 may comprise a diffusing layer configured to reflect and scatter light to have a uniform output over an emitting surface 36 of the indicator 14. Though discussed in reference to the rearview mirror assembly 10, the indicator 14 may be utilized in a variety of applications. For example, the indicator may be utilized in a display module 16, a side mirror 18, and/or various portions of the vehicle 12.

Figure 2:
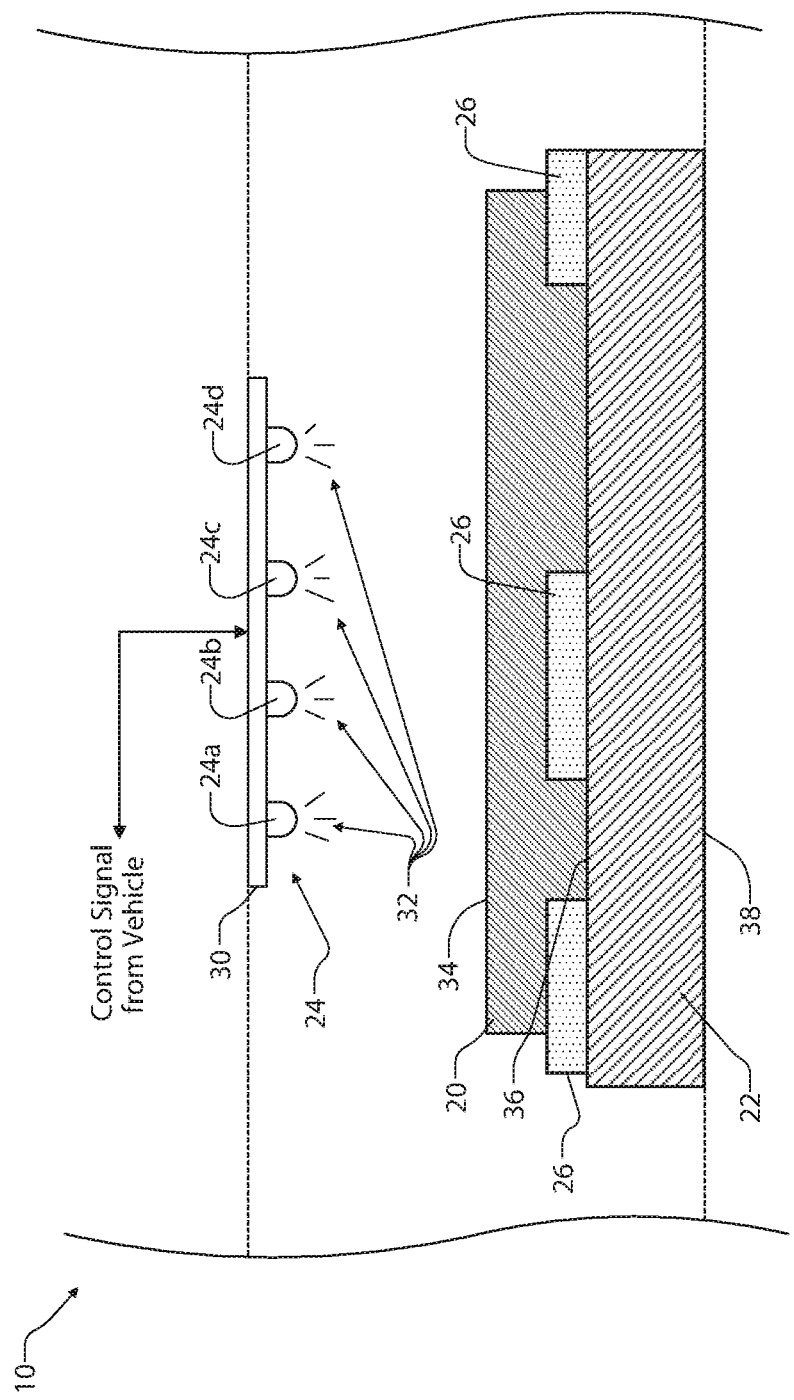
FIG. 2 is a detailed side schematic view of an embodiment of a mirror assembly.

Referring now to FIG. 2, a side cross-sectional view of the mirror assembly 10 is shown demonstrating a configuration of the diffusing layer 20 incorporated as a portion of the indicator 14. The disclosure may provide for various arrangements of the diffusing layer 20 in relation to a substrate 22, a light source 24, and various portions or components of the mirror assembly 10. The disclosure may provide for various embodiments that may provide for various applications of the mirror assembly 10. Accordingly, like numbered elements may be referred to in various embodiments of the disclosure to describe like components for clarity.

As demonstrated in FIG. 2, the mirror assembly 10 may comprise the diffusing layer 20 applied to and/or bonded to the substrate 22 of the mirror assembly 10 and a portion of the diffusing layer 20 may also be bonded directly to the masking or applique layer 26. In this configuration, the disclosure may provide for eliminating a need for adhesives or mechanical structures that may be required to retain a plastic film diffuser in the mirror assembly 10. This configuration also eliminates an air gap between the diffuser and the substrate, which may occur if the diffuser were an independent film without an adhesive. Accordingly, the diffuser material of the diffusing layer 20 may be applied as a liquid to a surface of the mirror substrate 22 and/or to the light source 24 and then cured in place.

In some configurations, though not shown, the mask 26 may consist of optically clear and optically opaque areas and the diffusing layer 20 may contact only the mask 26. In this configuration, the diffusing layer 20 may be applied directly to the mask 26 without adhesive and without an air gap between the mask 26 and the diffusing layer 20. A light source may be positioned behind the diffusing layer 20 in order to project light through the optically clear portions of the mask 26.

The diffusing layer 20 may be applied to the substrate 22 as a liquid layer over a mask 26 or applique. The mask 26 may be configured to define a shape, symbol 28, and/or character of the indicator 14 as shown in FIG. 1. In this configuration, the diffusing layer 20 may serve to secure or laminate the mask 26 to the substrate. Accordingly, the diffusing layer 20 may be applied directly and/or indirectly to the substrate 22 on one or more intermediate layers (e.g. the mask 26) of the mirror assembly 10. In each of these embodiments, the diffusing layer 20 may be applied to the mirror assembly 10 as a liquid configured to cure and self-adhere to the substrate 22 and/or the one or more intermediate layers.

The light source 24 may correspond to one or more light emitting diodes (LEDs) or various light producing devices. The light source 24 may be in conductive communication with a circuit 30, which may correspond to a printed circuit board (PCB). In operation, the light source 24 may generate one or more emissions 32 of light originating from one or more light producing devices (e.g. devices 24a, 24b, 24c, 24d). The circuit 30 may be in communication with one or more control switches and/or systems of the vehicle 12. In this configuration, the circuit 30 may receive one or more signals from at least one control switch and/or vehicle system. In response to the control signal, the circuit 30 may selectively illuminate the light source 24 and the indicator 14.

The one or more emissions 32 emitted from the light source 24 may be received by the diffusing layer 20 along a receiving surface 34. Each of the emissions may have an increased intensity proximate the light producing devices 24a-24d or an origin of each of the emissions. The diffusing layer 20 may substantially scatter and distribute the emissions 32 along an emitting surface 36 of the diffusing layer 20. In this way, the light from the emissions 32 that is output through the substrate 22 may appear to be consistently and uniformly emitted from a display surface 38 of the substrate 22. Accordingly, the light emitted from the indicator 14 may uniformly illuminate the symbol 28.

As discussed herein, the diffuser or diffusing layer 20 may provide for flexibility in a manufacturing process of the mirror assembly 10. For example, the diffusing layer 20 may be applied to the substrate 22 as a single diffusing layer or multiple diffusing layer portions as discussed in reference to FIG. 4. Each of the diffusing layer portions may comprise differing optical, conductive, or various properties that may provide for flexibility in design and manufacturing of the mirror assembly 10. Additionally, by bonding the diffusing layer 20 to the substrate, a need for adhesives or fixtures to hold the diffuser in place may be eliminated.

One potential advantage of directly attaching or bonding the diffusing layer 20 to the mirror assembly 10 may include reducing or eliminating the use of adhesives to secure the diffuser in the mirror assembly 10. Adhesives may trap pockets or bubbles of air or contaminants when applied resulting in inconsistent illumination of the indicator 14. Additionally adhesives may lose adhesion especially with high temperatures and high humidity. Also, films that are held mechanically may warp and potentially shift with environmental exposure and with vibration.

Figure 3:
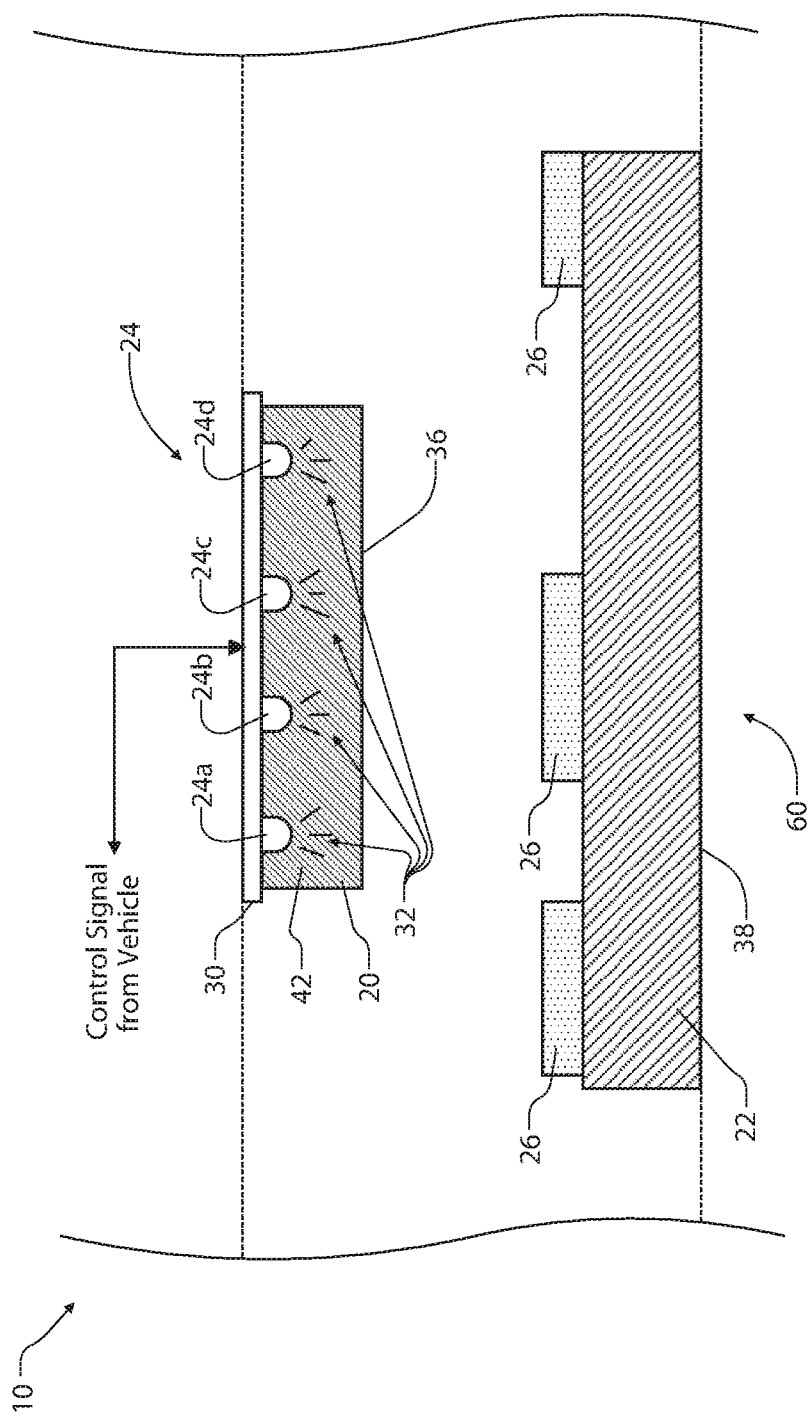
FIG. 3 is a detailed side schematic view of an embodiment of a mirror assembly.

Referring now to FIG. 3, the mirror assembly 10 may comprise the diffusing layer 20 applied to and/or bonded to the light source 24 of the mirror assembly 10. As discussed herein, such a configuration may provide for eliminating a need for adhesives or mechanical structures that may otherwise be required to retain a diffuser in the mirror assembly 10. When applied to the light source 24 and/or the circuit 30, the diffusing layer 20 may substantially enclose the light source 24. In some embodiments, the diffusing layer 20 may be applied directly to the circuit 30 and/or the light source 24 as a liquid and cured to form the diffusing layer 20.

In various embodiments, the diffusing layer 20 may be applied directly and/or indirectly to the substrate 22, the light source 24, the mask 26, and/or the circuit 30. Indirect application of the diffusing layer may include application of a liquid configured to form the diffusing layer on one or more intermediate layers of the circuit 30 (e.g. a conformal coating). Accordingly, the diffusing layer 20 may be applied to the mirror assembly as a liquid configured to cure and self-adhere to the circuit 30 and/or the substrate 22.

In embodiments wherein the diffusing layer is applied to the light source 24 and/or the circuit 30, the one or more emissions 32 emitted from the lighting devices 24a-24d into a body portion 42 of the diffusing layer 20. Once received by the diffusing layer 20, the light from the emissions 32 may be scattered and distributed along the emitting surface 36 of the diffusing layer 20. In this way, the light from the emissions 32 that is output from the emitting surface 36 may be received by the substrate 22 uniformly such that the display surface 38 of the substrate 22 corresponding to the indicator 14 is also illuminated uniformly.

Figure 4:
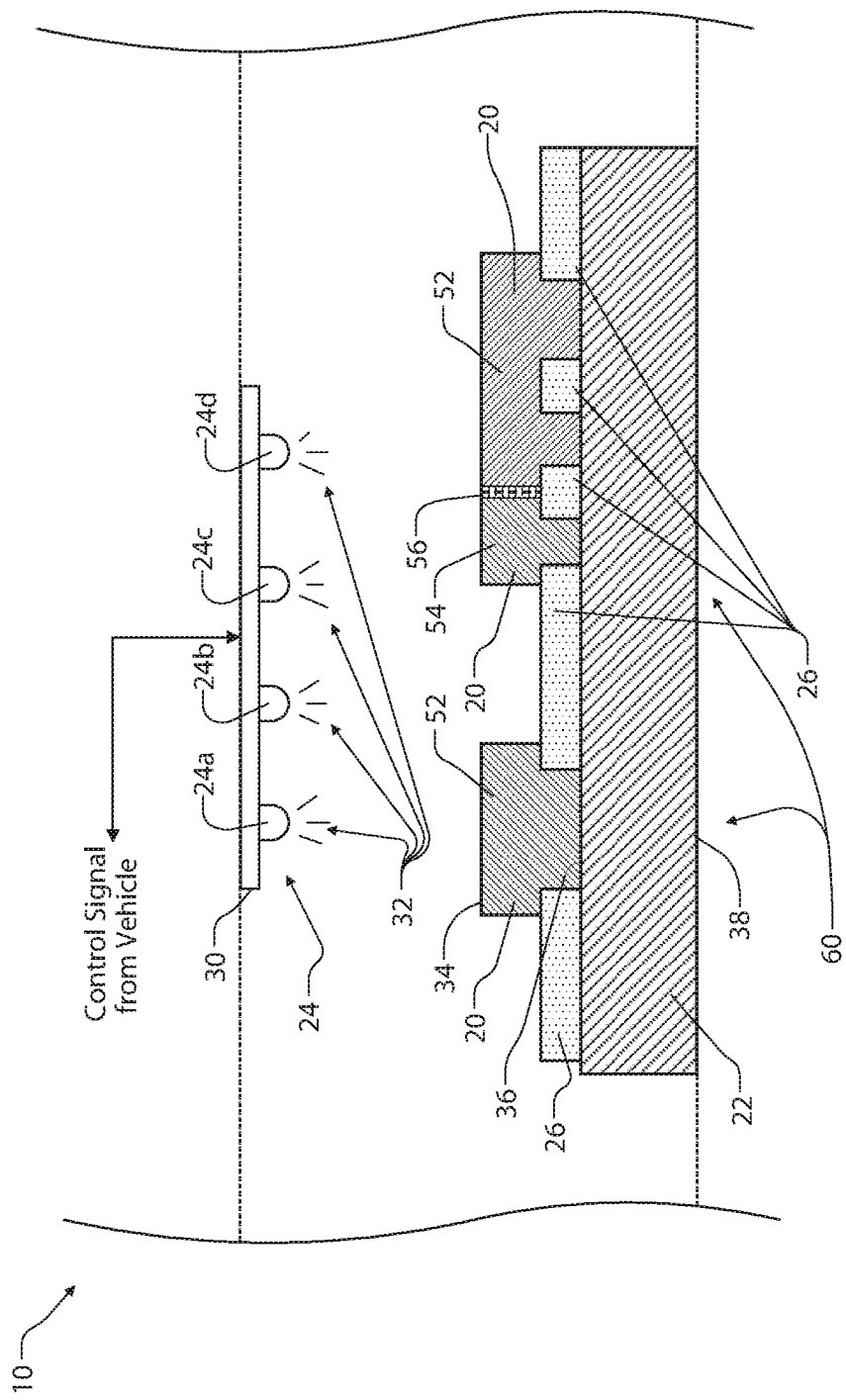
FIG. 4 is a detailed side schematic view of an embodiment of a mirror assembly.

Referring to FIG. 4, the diffusing layer 20 may be applied to the substrate 22 as multiple diffusing layer portions. As shown in FIG. 4, the diffusing layer 20 may correspond to a first diffusing portion 52 and a second diffusing portion 54. The first diffusing portion 52 and the second diffusing portion 54 may each be configured to have differing material properties (e.g. optical, conductive, etc.). Though demonstrated as being applied to the substrate in FIG. 4, the first diffusing portion 52 and the second diffusing portion 54 may be applied to various surfaces of the mirror assembly 10 as discussed herein.

As an example of differing optical properties, the first diffusing portion 52 may correspond to a high transmission diffuser material and the second diffusing portion 54 may correspond to a lower transmission diffusing material. In some embodiments, a first liquid material corresponding to the first diffusing portion 52 may be applied proximate a second diffusing liquid material corresponding to the second diffusing portion 54. If the positions of the first liquid material and the second liquid material are sufficiently close or partially overlapping, the materials may merge forming an intermediate diffusing portion 56 therebetween. The intermediate diffusing portion 56 is minimal and is hidden by the masking layer.

In some embodiments, the first diffusing portion 52 and the second diffusing portion 54 may be sufficiently spaced and or applied sequentially with sufficient time for the liquid materials to cure without substantially blending. In this configuration, each of the first diffusing portion 52 and the second diffusing portion 54 may retain their individual properties. The diffusing layer 20 may be configured to emit light outward through the display surface 38 of the substrate 22 demonstrating a contrast in light intensity from the different diffusing portion 52 and 54.

The materials of the first diffusing portion 52 and the second diffusing portion 54 may vary in composition, bead loading, light absorbance, thickness, color, and/or various material properties. As discussed in reference to FIG. 4, the materials of the diffusing layer 20 may be in direct contact with the mask 26 applied to the back of the substrate 22. In some embodiments, the mask 26 may correspond to a film, such as a vinyl film that is adhesively bound to the substrate 22. The mask 26 may also correspond to an ink, paint, frit, and/or other material applied to the substrate 22 and cured. In this configuration, the mask 26 and the diffusing layer 20 may be sequentially applied to the substrate 20.

Figure 5:
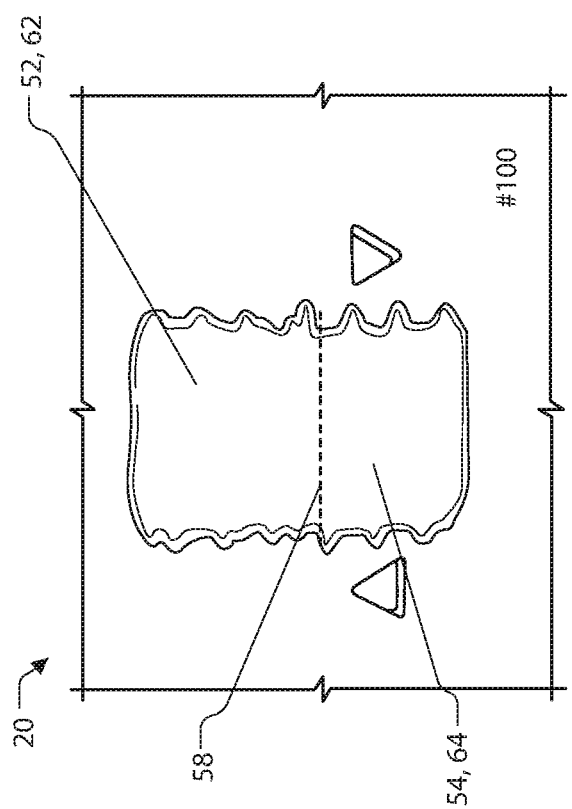
FIG. 5 is a pictorial view of a diffusing layer produced in accordance with an exemplary embodiment of the disclosure.

Referring now to FIGS. 4 and 5 in some embodiments, the first diffusing portion 52 and the second diffusing portion 54 may be configured to illuminate an icon area 60. In some embodiments, it may be desirable to produce a lower light output in one icon area relative to another icon area. In such embodiments, the light intensity at the surface of the diffuser may be similar while the transmittance through the first diffuser portion 52 may be lower than the transmittance from the second diffuser portion 54. The light intensity through each of the diffusing portions may be controlled by adjusting a concentration of the bead filler in each of the first diffuser portion 52 and the second diffuser portion 54. Accordingly, the first diffuser portion 52 may comprise a first concentration of the bead filler and the second diffuser portion 54 may comprise a second concentration of the bead filler. As a result, the light output from the first diffusing portion 52 may be lower or generally differ from the light output from the region associated with the second diffusing portion 54.

Again referring to FIGS. 4 and 5, in some embodiments the light source 24 may be configured to emit a first color of light while the first diffusing portion 52 may absorb a different spectral distribution of the light than the second diffusing portion 54. The result is that the light transmitted through the first diffusing portion 52 may correspond to a second color. Additionally, the light transmitted through the second diffusing portion 54 may correspond to a third color. Each of the second color and the third color may correspond to different colors produced from the first color of light. In this configuration it is possible to use a uniformly colored light source (e.g. the light source 24) and obtain a variety of colors in the various diffuser portions.

In some embodiments, at least one of the mask 26 and the diffusing layer 20 may be applied via a printing process. The printing process may include at least one of an inkjet printing process and/or a screen-printing operation. At least one example of a printing operation is discussed in U.S. Patent Publication 2014/0192392 A1, which is incorporated herein by reference in its entirety. The substrate 22 may correspond to a substrate of an electrochromic device as disclosed in U.S. Pat. No. 5,928,572 entitled "Electrochromic Layer and Devices Comprising Same," and International Patent Application Serial No. PCT/US98/05570 entitled "Electrochromic Polymeric Solid Films, Manufacturing Electrochromic Devices Using Such Solid Films, and Processes For Making Such Solid Films and Devices," both of which are hereby incorporated herein by reference in their entirety.

Accordingly, the diffusing layer 20, the mask 26, and/or various additional or intermediate layers of the mirror assembly 10 may be printed to the substrate 22 and/or the circuit 30 as discussed herein. The application of such layers may be processed by one or more application processes. Such application processes may occur sequentially and/or in parallel to locate a position of the one or more diffusing portions (e.g. 52, 54) of the diffusing layer 20 as well as on or more materials forming the mask 26. For example, an inkjet printing process may be utilized to deposit a type of material and corresponding amount via a software programmable operation.

In embodiments of the mirror assembly, the diffusing layer 20 may comprise similar ink or application medium as the lighting mask 26. In one example, the lighting mask 26 may be formed of a generally opaque acrylic based UV curable ink. The diffuser may correspond to a similar acrylic based UV curable ink with a polystyrene bead loading. In such embodiments, utilizing one or more diffuser materials similar to a material of the mask 26 may be beneficial due to the materials having similar thermal expansion. By utilizing similar materials, the adhesion and durability of the diffusing layer 20 and the mask 26 are improved.

In an exemplary embodiment, the diffuser material of the diffusing layer 20 may consist of two main components. The first component may correspond to a resin. The resin may be a base material for coating and wetting an application surface (e.g. the substrate 22). The second component may correspond to a filler or filler material. The filler may provide for a refractive index of a particular diffusing layer and an interface configured to diffract the light and cause a desired light diffusive effect.

In some embodiments, the resin may correspond to an acrylic based ultraviolet (UV) curable ink, and the filler may correspond to polystyrene (PS) bead filler. The acrylic based UV curable ink may comprise a mixture of clear and black ink. Such inks may correspond to a clear coat and black ink, respectively. The black ink may be utilized to tune the transmission of the diffusing layer 20 to a desired level. In various embodiments, concentrations of the black ink may range from 0-20%. In an exemplary embodiment, a concentration of black ink may be approximately 0-1%. Concentrations of the clear ink may range from approximately 40-95%. In an exemplary embodiment, a concentration of the clear ink may be approximately 60-65%. Additionally, the polystyrene bead filler concentration may range from approximately 5-60%. In an exemplary embodiment, a concentration of the filler may range from 30-35%.

The various materials utilized to form the diffusing layer may be combined in specific combinations to facilitate a desired effect. For example, the UV curable acrylic ink may have a refractive index of 1.49. Additionally, the polystyrene bead filler may have a refractive index of 1.595. The polystyrene bead filler may be incorporated to provide for diffusion. The moderate refractive index difference between the resin and the bead filler may be important to creating the diffusive effect by refracting the light from the light source 24. If materials were used having a smaller refractive index difference, diffraction may be too small to cause sufficient scattering of the light. A larger difference may not allow sufficient transmission of light through the diffusing layer 20.

Some materials that were tested for the resin included a thermally curable epoxy, UV curable epoxy, and additional UV curable acrylic inks. Some epoxy resins tested may have had a high viscosity when loaded with the filler. Additionally, some UV curable acrylic inks may have been too rigid to survive environmental testing. Some materials that were tested for the filler material included glass (borosilicate) beads, polymethylmethacrylate (PMMA) beads, PS/PMMA copolymer beads, silicone beads, titanium dioxide, and aluminum oxide. Based on the test results, the refractive index difference between some filler materials and some resin material were significantly higher than the combination of the UV curable acrylic ink and the polystyrene bead filler. In some instances, the refractive index difference was also significantly smaller than the UV curable acrylic ink and the polystyrene bead filler.

In some embodiments, the resin may comprise a thermally curable epoxy or similar thermally curable material. For example, the diffusing layer 20 may comprise a thermally curable epoxy based resin with an amine hardener combined with a silicone bead filler. In an exemplary embodiment, the epoxy-amine thermally curable resin may consist of 75% by weight of the fluid resin and 25% of the beads. The thermal curing may take place over a predetermined period of time, which may depend on a thickness associated with diffusing layer 20. In a specific embodiment, the thermal curing was processed at 100° C. for approximately 30 minutes.

In various embodiments, the beads of the bead filler may comprise bead structures that have a nominal particle size. That is, each of the filler beads of the filler material selected may have a size configured to control for a number of properties of the diffusing layer 20 including a surface leveling, a spectral light distribution, and a light transmissivity. Based on the embodiments discussed herein, the bead structures may have a nominal particle size approximately between 1 and 15 μm. In some embodiments, the nominal particle size of the bead structures may be approximately between 1 and 10 μm. In an exemplary embodiment, the nominal particle size of the bead structures may be approximately between 2 and 6 μm.

As discussed herein, the exemplary combination of the UV curable acrylic ink with the polystyrene bead filler resulted in a difference in refractive index of approximately 0.1. In some embodiments, the difference between the resin material (e.g. the acrylic ink) and the filler material (e.g. the bead filler) may result in a refractive index of less than or equal to 0.2. Other factors that may influence the level of light scattering may include an amount of beads (number of interfaces), the clarity of filler (level of transparency), the shape of the diffuser material, and the thickness of the diffusing layer 20. The shape of the diffuser material may correspond be beads that are substantially spherical, but various shapes of filler elements may similarly be utilized. There may also be an effect of how "sharp" the interface is between the bead and ink. A micro-roughness on the surface instead of glass-like smoothness may also affect the level of light scattering. Based on the embodiments discussed herein, the diffusing layer 20 may be incorporated in an illumination assembly of the mirror assembly 10 via a novel manufacturing method. The process may begin by preparing the substrate 22 comprising the display surface 38 to receive a coating. The applique 26 may be applied to the emitting surface 36 creating a negative shape of the diffuse light indicator. The liquid diffuser layer comprising a resin material and the filler material may then be applied over the applique 26. The circuit 30 comprising at least one light source 24 may then be attached to the substrate 22 enclosing the applique 26 and the diffusing layer 20 therebetween. The liquid diffuser layer may be cured thereby generating a hardened diffusing layer 20 laminating the substrate 22 to the circuit 30.

Referring now to FIG. 5, a dispensed and cured diffusing layer 20 or diffuser is shown demonstrating two materials (e.g. a first diffuser material and a second diffuser material). Each of the diffuser materials in the sample shown was dispensed and cured on a surface to form a diffusing layer 20 having the first diffusing portion 52 and the second diffusing portion 54. The first diffusing portion 52 has a higher transmission than the second diffusing portion 54. In this example, the first diffusing portion 52 and the second diffusing portion 54 correspond to two different materials each having a similar thickness. The primary difference between the first material and the second material is that a change in a ratio of the black ink to the clear ink in the acrylic based UV curable ink. A content of the polystyrene bead material in each of the first diffusing portion 52 and the second diffusing portion is approximately 33.3%.

In an exemplary embodiment, the diffusing material may have a viscosity and cohesion sufficient to provide for the material to self-level during a dispensing process. Accordingly, the one or more diffusing materials of the diffusing layer may be dispensed in discrete lines that merge together. Accordingly, a dispensing method for the diffusing layer 20 may include slot die coating. However, an inkjet printing process or various other manufacturing methods may be suitable for the application of the diffusing material in its liquid form. An example of an inkjet process that may be utilized to apply the diffusing material is disclosed in U.S. Patent Publication US 2014/0192392 A1, which is incorporated herein by reference in its entirety.

Figure 6:
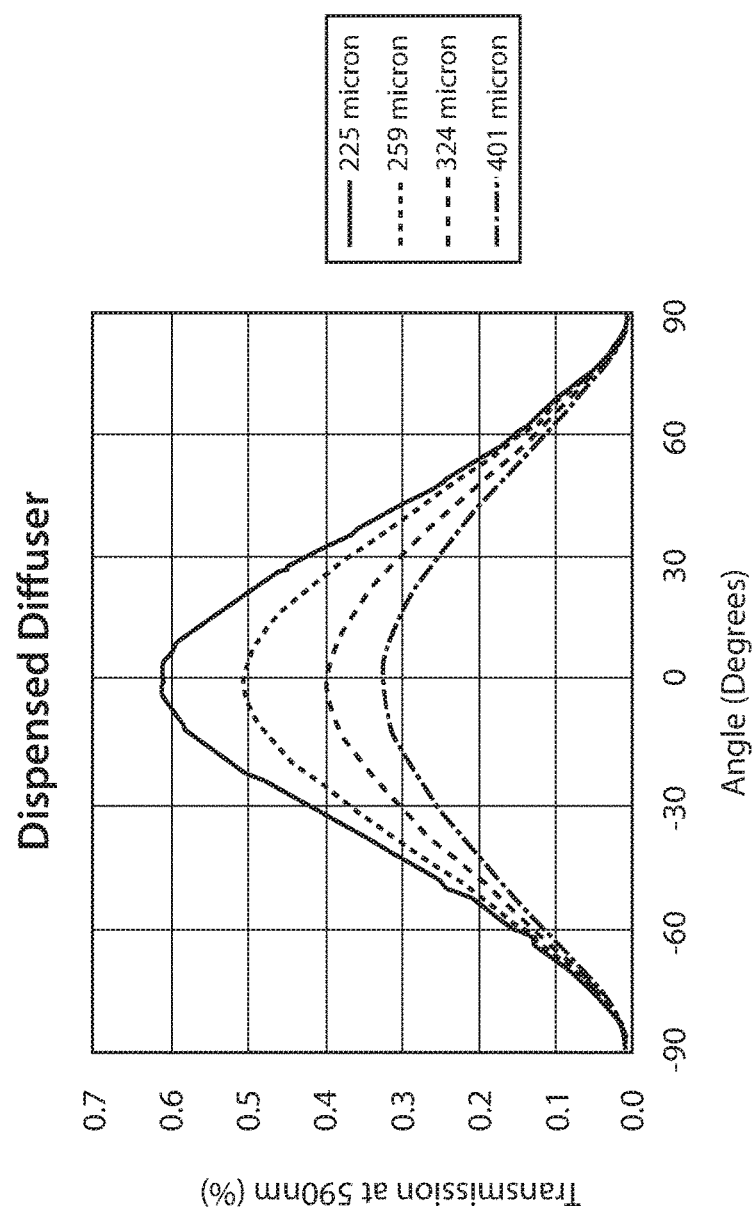
FIG. 6 is a plot demonstrating a relationship between a thickness of a diffuser and a transmission.

Referring to FIG. 6, a plot demonstrating transmission properties of the diffusing layer 20 is shown. The plot demonstrates that an increased thickness of the diffusing layer 20 may result in a decrease in light transmission. As expected, the thinner material of the diffusing layer 20 may provide a higher peak transmission. The thinnest sample at 225 µm thickness was measured to have a transmission of about 62 when measured normal to the surface of the substrate. The test sample having a thickness of 401 µm was measured to have a transmission of about 33% normal to the surface of the substrate. The total light transmission from the sample with the thickest diffusing layer 20 is lower than it is from the sample with a thinner diffusing layer 20. Samples with a higher peak transmission will have more of a light output hot spot than the samples with a flatter distribution of the light over various viewing angles.

Figure 7:
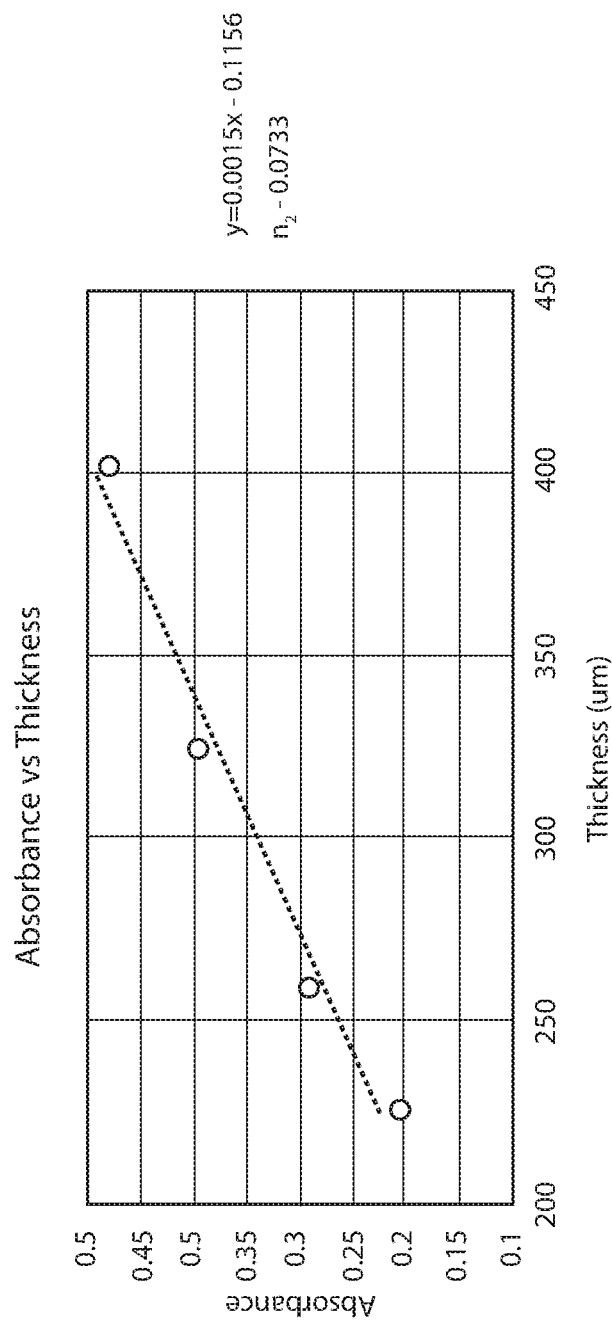
FIG. 7 is a plot demonstrating a relationship between a thickness of a diffuser and an absorbance in accordance with the disclosure.

Referring now to FIG. 7 a plot of an absorbance at the center of a viewing cone compared to the thickness of the diffuser material is shown. The values demonstrated in FIG. 6 correspond to the data utilized to generate FIG. 7. As illustrated in FIG. 6, there is a correlation between the thickness of the diffusing layer 20 to the amount of transmission and diffusion of light through the diffusing layer 20. In an exemplary embodiment, the relationship of the absorbance to the thickness of the diffusing layer 20 over the portion shown is substantially linear and may be quadratic over a range. Accordingly, the diffusing layer 20 may be easily adjusted for a variety of applications.

In some embodiments, the parameters, including the thickness, of the diffusing layer 20 may be adjusted to account for variation in the light source 24. For example, if the light source 24 provides 10% lower light output compared to a design guideline, the diffuser thickness may be thinned to increase the transmittance back to the design target. In this way the diffusing layer 20 may provide for flexibility in manufacture of the mirror assembly 10.

The disclosure may provide for various benefits including efficient manufacturing of a mirror assembly. The methods and systems discussed herein provide for flexible solutions that may be implemented in a wide variety of applications. Accordingly, the disclosure may provide for a diffuser configured to be efficiently implemented in a lighting apparatus. Though discussed in reference to the particular embodiment of a vehicular mirror assembly, the diffuser or diffusing layer as discussed herein may be utilized in various applications for the diffusion of light.

For purposes of disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An illumination assembly configured to emit diffuse light through an indicator, the assembly comprising:
a substrate;
an applique disposed on the substrate forming an opening, wherein the opening defines a shape configured to transmit light through the substrate;
a light source in connection with a circuit and configured to emit light through the shape; and
a diffusing layer comprising a first portion and a second portion applied to a surface of the assembly between the circuit and the substrate, the diffusing layer comprising:
a resin material; and
a filler material comprising a plurality of bead structures configured to diffuse light from the light source, wherein the first portion comprises a first concentration of the bead structures and the second portion comprises a second concentration of the bead structures and the first concentration provides for a different spectral distribution of light than the second concentration.

2. The illumination assembly according to claim 1, wherein the resin material corresponds to a curable ink that cures in response to ultraviolet (UV) light or heat.

3. The illumination assembly according to claim 1, wherein the resin material corresponds to acrylic based UV curable ink.

4. The illumination assembly according to claim 1, wherein the bead structures correspond to a plurality of polystyrene beads.

5. The illumination assembly according to claim 4, wherein the first refractive index and the second refractive index differ by less than 0.2.

6. The illumination assembly according to claim 1, wherein the resin material has a first refractive index and the filler material has a second refractive index.

7. The illumination assembly according to claim 1, wherein the bead structures have a particle size between 1 and 15 µm.

8. The illumination assembly according to claim 1, wherein the bead structures have a particle size between 2 and 6 µm.

9. A method for manufacturing an illumination assembly comprising a diffuse light indicator comprising the steps of:
- preparing a substrate corresponding to a display surface to receive a coating;
- applying an applique on the substrate thereby forming an opening, wherein the opening defines a shape of the diffuse light indicator;
- applying a first liquid diffusing layer over the applique, the liquid diffusing layer comprising a resin material and a filler material having a first concentration of bead structures;
- applying a second liquid diffusing layer over the applique, the second liquid diffusing layer comprising a resin material and a filler material having a second concentration of bead structures, wherein the first concentration provides for a different spectral distribution of light than the second concentration and a second light transmittance through the second liquid diffusing layer is greater than a first light transmittance through the first liquid diffusing layer;
- attaching a circuit comprising at least one light source to the substrate enclosing the applique and the diffusing layer therebetween; and
- curing the liquid diffusing layer thereby generating a hardened diffusing layer laminating the substrate to the circuit.

10. The method according to claim 9, wherein the curing comprises exposing the liquid diffusing layer to UV radiation or heat.

11. The method according to claim 9, wherein the liquid diffusing layer comprises a resin material and a filler material.

12. The method according to claim 11, wherein the filler material corresponds to polystyrene beads.

13. The method according to claim 9, wherein the resin material has a first refractive index and the filler material has a second refractive index.

14. The method according to claim 13, wherein the first refractive index and the second refractive index differ by less than 0.2.

15. An illumination assembly configured to emit diffuse light through an indicator, the assembly comprising:
- a substrate;
- an applique disposed on the substrate, the applique defining a light transmissive opening through the substrate, wherein the opening forms a negative shape configured to transmit light through the substrate;
- a light source in connection with a circuit and configured to emit light through the shape; and
- a diffusing layer comprising a first portion and a second portion applied to a surface of the assembly between the circuit and the substrate, wherein each of the first portion comprises a filler material comprising a first concentration of bead structures and the second portion comprises the filler material comprising a second concentration of bead structures, wherein the first concentration transmits a different spectral distribution of light greater than the second concentration and a second light transmittance through the second portion is greater than a first light transmittance through the first portion.

16. The illumination assembly according to claim 15, wherein the beaded structures correspond to a plurality of polystyrene beads.

* * * * *